US010610053B2

United States Patent
Masterson et al.

(10) Patent No.: US 10,610,053 B2
(45) Date of Patent: Apr. 7, 2020

(54) PORTABLE STOVE FOR S'MORES

(71) Applicant: STERNO PRODUCTS, LLC, Corona, CA (US)

(72) Inventors: Daniel J. Masterson, Geneva, IL (US); Dipan Surati, Palatine, IL (US); David Amirault, Trabuco Canyon, CA (US)

(73) Assignee: Sterno Products, LLC., Corona, CA (US)

(*) Notice: Subject to any disclaimer, the term of this patent is extended or adjusted under 35 U.S.C. 154(b) by 477 days.

(21) Appl. No.: 15/355,947

(22) Filed: Nov. 18, 2016

(65) Prior Publication Data

US 2017/0143161 A1 May 25, 2017

Related U.S. Application Data

(60) Provisional application No. 62/259,443, filed on Nov. 24, 2015.

(51) Int. Cl.
*A47J 37/07* (2006.01)

(52) U.S. Cl.
CPC ....... *A47J 37/0763* (2013.01); *A47J 37/0786* (2013.01)

(58) Field of Classification Search
CPC .......................... A47J 37/0763; A47J 37/0786
USPC .......................................................... 99/447
See application file for complete search history.

(56) References Cited

U.S. PATENT DOCUMENTS

| | | | |
|---|---|---|---|
| 3,327,108 A * | 6/1967 | Press | F21L 19/00 362/161 |
| 4,028,118 A | 6/1977 | Nakasuji et al. | |
| 5,499,597 A | 3/1996 | Kronberg | |
| 6,449,434 B1 * | 9/2002 | Fuss | F03G 7/065 396/97 |
| 6,694,912 B2 | 2/2004 | Wesley | |
| 6,701,912 B1 | 3/2004 | Siegel et al. | |
| 7,117,865 B2 | 10/2006 | Siegel et al. | |
| 7,173,221 B2 | 2/2007 | Lerner | |
| 7,364,357 B2 | 4/2008 | Wu | |
| 10,279,065 B1 * | 5/2019 | Mubarak | A61L 9/03 |
| 2004/0004069 A1 | 1/2004 | Lerner | |
| 2005/0000368 A1 * | 1/2005 | Siegel | A47J 37/1242 99/400 |
| 2005/0016985 A1 * | 1/2005 | Haas | A61L 9/03 219/438 |
| 2010/0254078 A1 * | 10/2010 | Zheng | H05K 7/142 361/679.02 |
| 2012/0104743 A1 | 5/2012 | Mehta et al. | |
| 2014/0099411 A1 * | 4/2014 | Darnell | A23G 3/0063 426/241 |

(Continued)

FOREIGN PATENT DOCUMENTS

WO WO2011134029 11/2011
WO WO2012055709 5/2012

*Primary Examiner* — Dana Ross
*Assistant Examiner* — Kuangyue Chen

(57) ABSTRACT

A portable stove for cooking s'mores is disclosed herein wherein a gel chafing fuel is centrally disposed within a shell and away from the shell so that heat generated by the gel chafing fuel does not heat up the shell excessively so that a person would burn his or her fingers if the person touches the exterior surface of the shell. The portable stove has a gel chafing fuel holder for positioning the gel chafing fuel within the shell.

20 Claims, 9 Drawing Sheets

(56) References Cited

U.S. PATENT DOCUMENTS

2015/0013664 A1* 1/2015 Riel .................... A47J 37/0781
  126/506
2015/0075514 A1* 3/2015 Kuenzinger ........ A47J 37/0763
  126/25 A

* cited by examiner

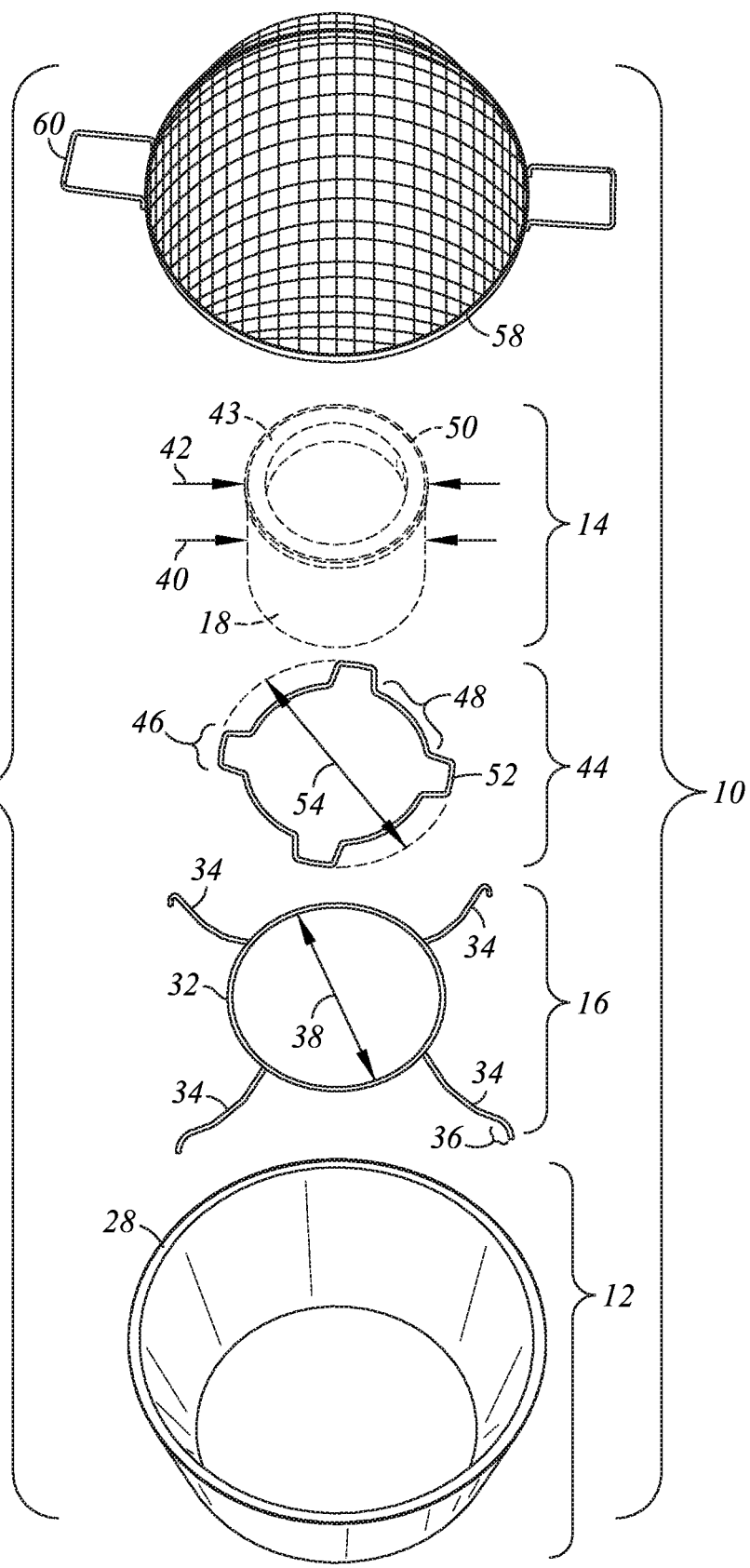

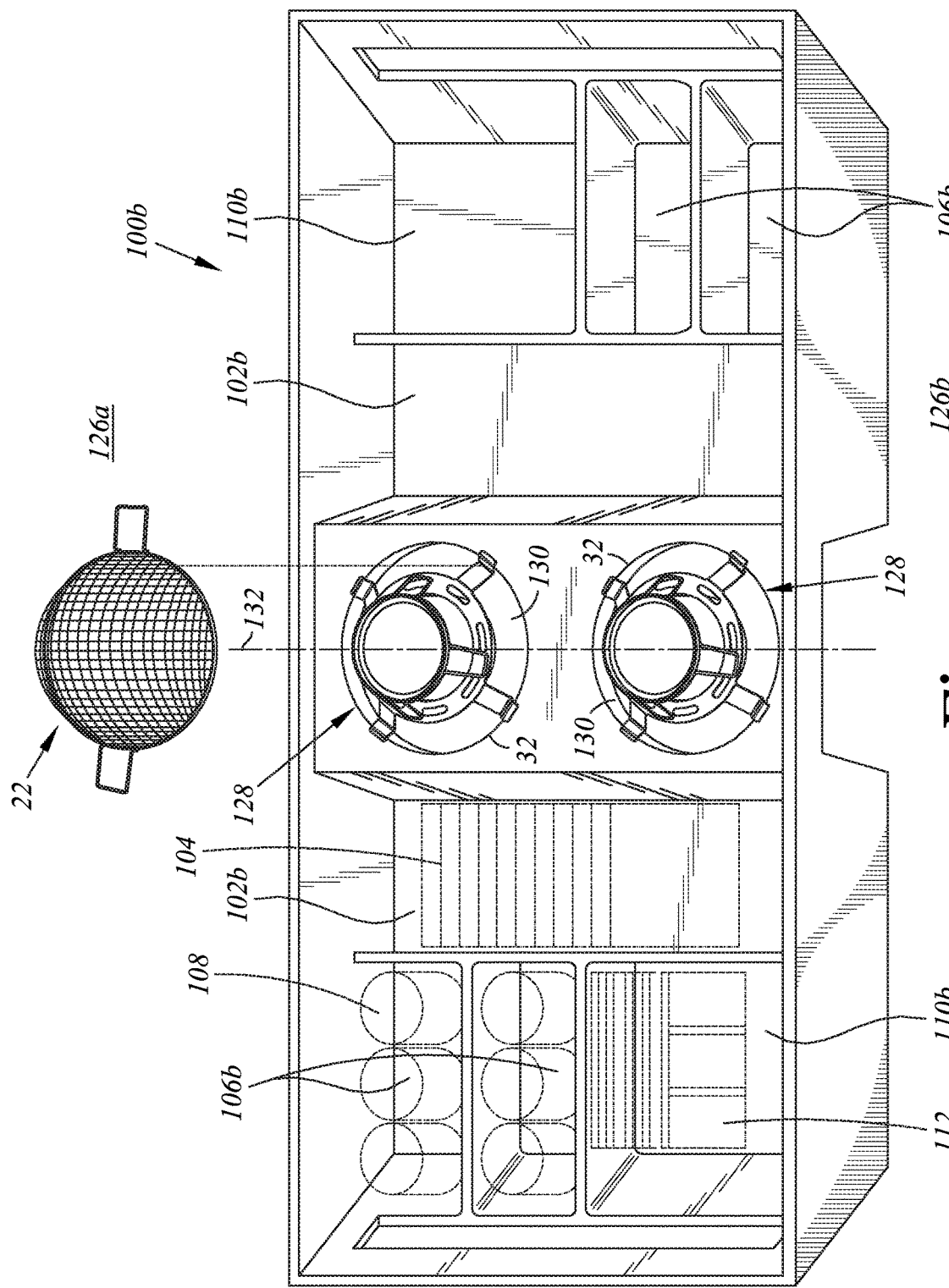

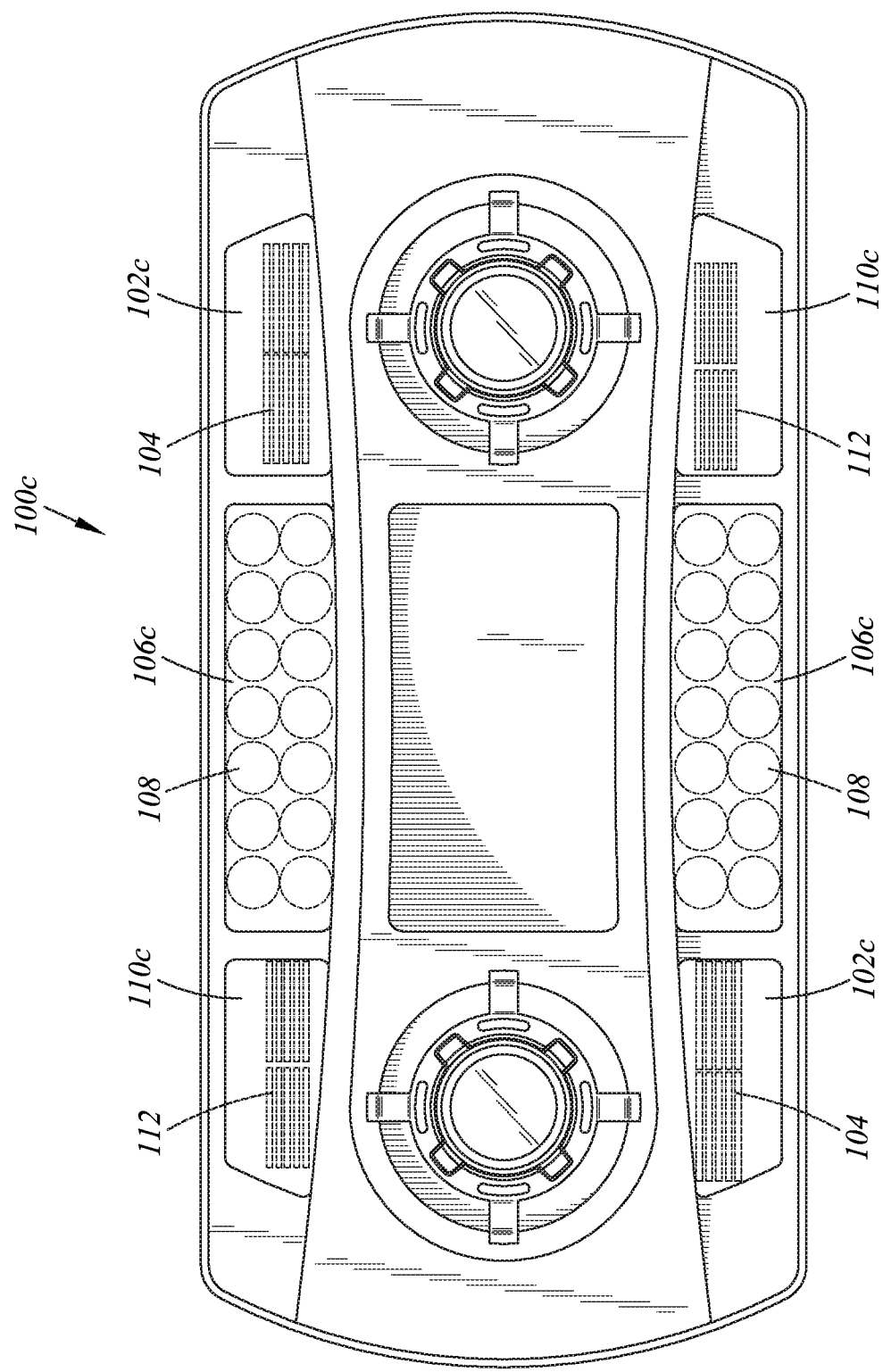

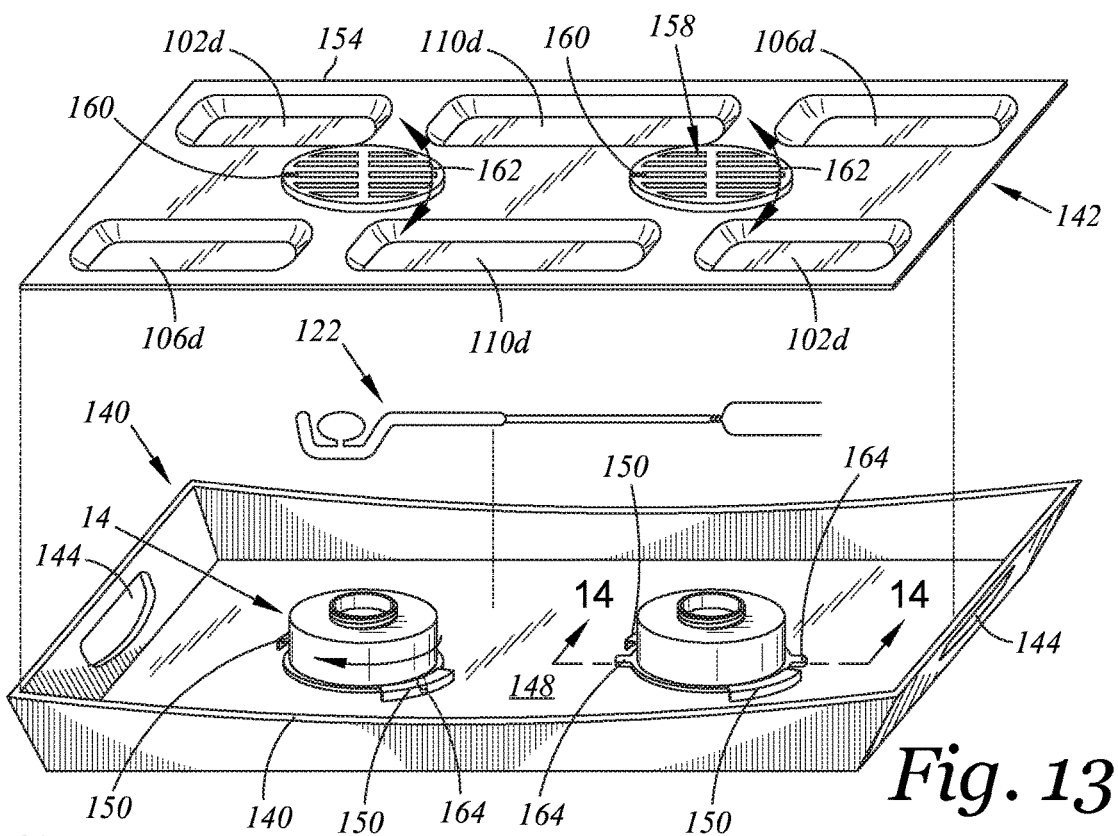
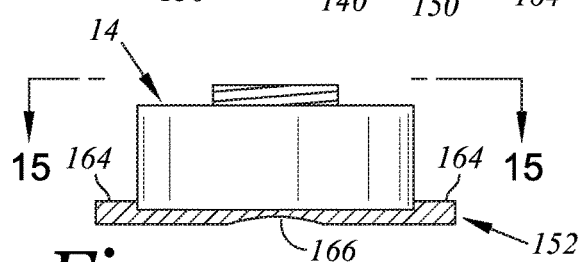
Fig. 14
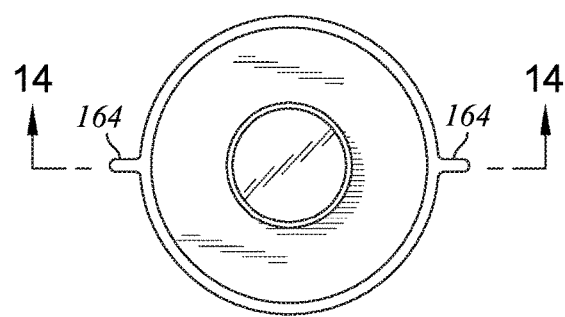
Fig. 15
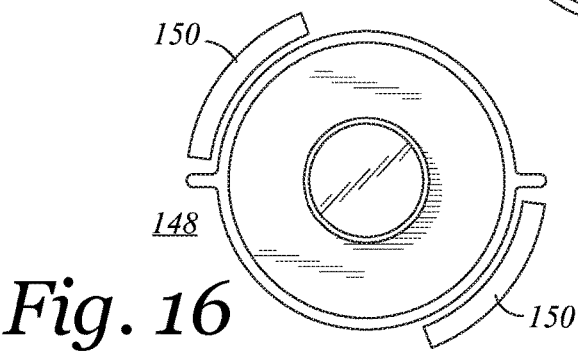
Fig. 16

PORTABLE STOVE FOR S'MORES

CROSS-REFERENCE TO RELATED APPLICATIONS

Not applicable

STATEMENT RE: FEDERALLY SPONSORED RESEARCH/DEVELOPMENT

Not Applicable

BACKGROUND

The various embodiments described herein relate to a s'mores type device.

S'mores are a great American treat typically cooked over a natural wood fire flame. However, cooking a s'more is often times messy and dangerous. The reason is that the natural wood fire flame is generated from a set of logs at a campfire and oftentimes the flames are quite large. As such, the participant cooks the s'mores on a s'more holder and holds the s'mores As such, the participant must heat the marshmallow separate from the graham crackers and chocolate bar on an extremely long stick. Unfortunately, during the heating of the marshmallow, the marshmallow may fall off and be dropped into the fire requiring the participant the heat up another marshmallow. Also, the natural wood fire flame poses a danger to kids who are the primary beneficiaries of s'mores.

Accordingly, there is a need in the art for an improved portable stove for cooking s'mores.

BRIEF SUMMARY

A portable stove for cooking s'mores is disclosed herein. The portable stove has a shell in which a gel chafing fuel is centrally disposed. Moreover, the gel chafing fuel is gap away from the exterior shell so that heat generated from the gel chafing fuel does not excessively heat the shell so that the shell does not burn a person touching the shell. Moreover, the portable stove includes a holder which positions the gel chafing fuel so that the upper edge of the gel chafing fuel is higher than an upper edge of the shell. In this regard, the flames that project upward from the gel chafing fuel do not directly contact the shell which might overheat the shell if direct flame contact was made. The portable stove also includes an optional wireframe cover to prevent marshmallow from falling into the gel chafing fuel during cooking of the s'mores.

More particularly, a combination heater for cooking s'mores and a gel chafing fuel disposable within the heater is disclosed. The combination may comprise the heater and the gel chafing fuel. The heater may have a lower exterior shell, a wire frame cover and a holder for the gel chafing fuel. The lower exterior shell holds the gel chafing fuel which cooks the s'mores when the gel chafing fuel is burning. The lower exterior shell may have an upper peripheral edge. The lower exterior shell may be fabricated from a non-heat resistant material.

The wire frame cover may be disposed above the lower exterior shell to define a minimum distance between the gel chafing fuel and the smores being cooked. The wire frame cover may have a lower peripheral edge.

The gel chafing fuel holder attached to the lower exterior shell so that the lower exterior shell is touchable when the gel chafing fuel is burning. The gel chafing fuel holder may have a ring and at least three legs. The ring may have has a hole that defines an inner diameter. The inner diameter of the hole of the ring may be greater than an outer diameter of the gel chafing fuel. The at least three legs may be sufficiently so as to be capable extending from the ring to the upper peripheral edge of the lower exterior shell. Distal portions of the at least three legs may be adapted to have first seats and second seats. The first seats may be on bottom sides of the at least three legs for receiving the upper peripheral edge to center the ring within the lower exterior shell. The second seat may be on top sides of the at least three legs for receiving the lower peripheral edge of the wire frame cover to center the wire frame cover on top of the lower exterior shell.

The gel chafing fuel may contain the fuel. The gel chafing fuel may have a cylindrical body containing the fuel.

Three or more tabs may extend outward so that a circle defined by distal points of the three or more tabs may have a diameter greater than an inner diameter of the hole of the ring of the gel chafing fuel holder. The three or more tabs of the gel chafing fuel may be fabricated as being unitary with the body. The three or more tabs of the gel chafing fuel may be fabricated from a $\frac{1}{16}$ inch diameter wire rod that circumscribes the body and has an inner diameter smaller than an outer diameter of an upper crimped edge of the body.

The first seats of the at least three legs may define a circle having a diameter equal to or about equal to a diameter of the upper peripheral edge of the lower exterior shell so that the first seats physically contact the upper peripheral edge. The first seats may have an inverted concave configuration.

The second seats of the at least three legs may define a circle having a diameter equal to or about equal to a diameter of the lower peripheral edge of the wire frame cover so that the second seats physically contacts the lower peripheral edge. The second seats may have an upright concave configuration.

The gel chafing fuel holder may be fabricated from $\frac{1}{32}$ inch thick sheet metal or a $\frac{1}{16}$ inch diameter metallic wire rod. The gel chafing fuel holder may be fabricated from a material that does not melt if raised to a maximum temperature of the gel chafing fuel and the lower exterior shell is fabricated from a material that does melt if raised to a maximum temperature of the gel chafing fuel. The gel chafing fuel holder may be fabricated from a metallic material and the lower exterior shell is fabricated from a plastic material.

The lower exterior shell may be a s'more tray including at least one graham cracker holding compartment for holding graham crackers; at least one marshmallow holding compartment for holding marshmallows; at least one chocolate bar holding compartment for holding chocolate bars; at least one staging area for stacking the graham cracker, marshmallow and chocolate bar; and a central hole in which the gel chafing fuel holder and gel chafing fuel may be placed in to provide a heat source to heat the components of the s'more.

In a different variant of the s'more's tray, the s'mores tray may have two graham cracker holding compartment for holding graham crackers; at least two marshmallow holding compartment for holding marshmallows; at least two chocolate bar holding compartment for holding chocolate bars; at least two staging areas for stacking the graham crackers, marshmallows and chocolate bars; and a single hole positioned in a center of the tray in which the gel chafing fuel holder and gel chafing fuel may be placed in to provide a heat source to heat the components of the s'more.

The graham cracker holding compartments may be disposed on opposite sides of the single hole. The chocolate bar holding compartments may be disposed on opposite sides of the single hole so that two people can have access to all components of the s'more during use.

In another aspect, a heater for cooking s'mores is disclosed. The heater may comprise an exterior shell and a gel chafing fuel holder. The exterior shell holds a gel chafing fuel which cooks the s'mores when the gel chafing fuel is burning. The exterior shell may have an upper peripheral edge.

The gel chafing fuel holder may be attachable to the lower exterior shell so that the exterior shell is touchable by a person when the gel chafing fuel is burning without burning the person. The gel chafing fuel holder may have a ring and at least three legs. The ring may have a hole that supports the gel chafing fuel. The at least three legs may each extend equidistantly from the ring to the upper peripheral edge of the lower exterior shell to center the gel chafing fuel in the exterior shell when the gel chafing fuel is received in the hold of the ring of the gel chafing fuel holder. Distal portions of the at least three legs may be adapted to have first seats on bottom sides of the at least three legs for receiving the upper peripheral edge.

The heater may further comprise a wire frame cover disposed above the lower exterior shell to define a minimum distance between the gel chafing fuel and the s'mores being cooked. The wire frame cover may have a lower peripheral edge supportable on the at least three legs of the gel chafing fuel holder. The at least three legs may define second seats that receive the lower peripheral edge of the wire frame cover.

An inner diameter of the hole of the ring may be less than an outer diameter of an upper crimped edge of a body of the gel chafing fuel.

The heater may further comprise a retainer removably attachable to the gel chafing fuel. The retainer may have three or more tabs that radially extend outward and three or more base portions that catch the upper crimped edge of the gel chafing fuel when the retainer is mounted to the gel chafing fuel.

The retainer may be fabricated from a wire rod. An inner diameter defined by the base portions of the retainer may be undersized to an outer diameter of a body of the gel chafing fuel so that the retainer slides on the body of the gel chafing fuel with a friction fit.

At least one tab of the at least three tabs may be bent upright so that the person may grip the tab to lift the gel chafing fuel out of the hole of the ring of the gel chafing fuel holder.

The heater may further comprise a basket attached to the gel chafing fuel holder under the hole for supporting the gel chafing fuel.

The gel chafing fuel holder may be fabricated from a material that does not melt if raised to a maximum temperature of the gel chafing fuel and the exterior shell is fabricated from a material that does melt if raised to a maximum temperature of the gel chafing fuel. The gel chafing fuel holder may be fabricated from a metallic material and the exterior shell may be fabricated from a plastic material.

BRIEF DESCRIPTION OF THE DRAWINGS

These and other advantages and features of the invention will be better appreciated in view of the following drawings and descriptions in which like numbers refer to like parts throughout, and in which:

FIG. 2 is an exploded perspective view of the portable stove shown in FIG. 1;

FIG. 11 is a perspective view of a second embodiment of the tray for cooking s'mores;

FIG. 12 is a perspective view of a third embodiment of the tray for cooking s'mores;

FIG. 13 is an exploded view of a fourth embodiment of the tray for cooking s'mores;

FIG. 14 is a cross-sectional side view of the gel chafing fuel and a lock ring for securing the gel chafing fuel 14 to a carry tray;

FIG. 15 is a top view of the gel chafing fuel and the lock ring shown in FIG. 14;

FIG. 16 illustrates a lock channel on the carry tray shown in FIG. 13 engageable with the lock ring.

DETAILED DESCRIPTION

Figure 1:
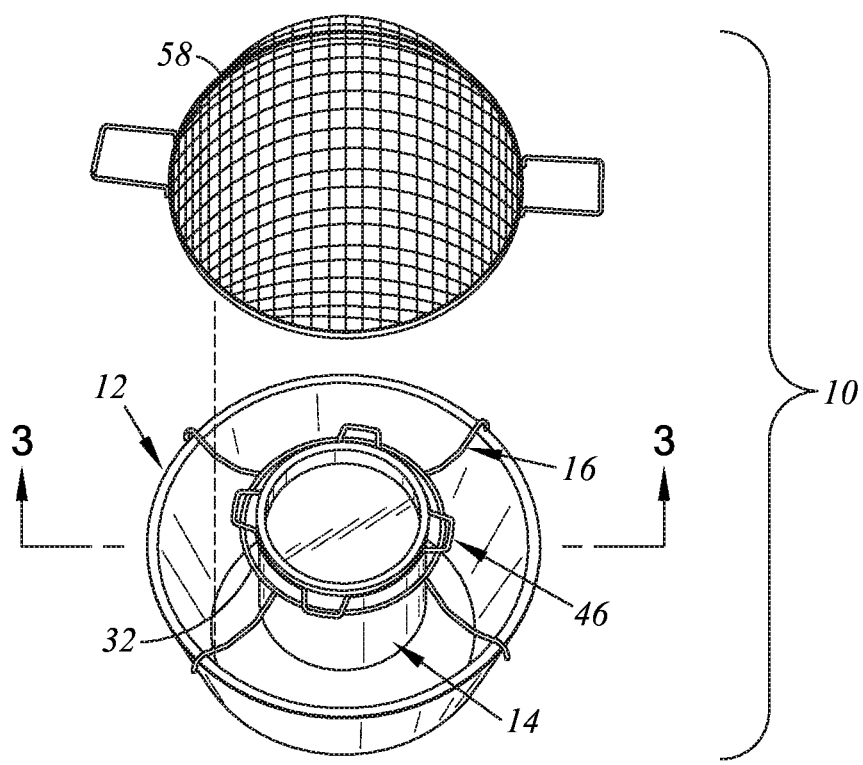
FIG. 1 is a perspective exploded view of a portable stove.

Referring now to the drawings, the portable stove 10 is shown. An exterior shell 12 of the portable stove 10 may be fabricated from a material that may melt or deform when subject to excessive heat such as temperatures that arise from a gel chafing fuel 14 of the portable stove 10. The exterior shell 12 may be protected from the heat source, namely, the gel chafing fuel 14 held within the exterior shell with a holder 16 by centrally disposing the gel chafing fuel 14 within and spaced away from the exterior shell 12. Preferably, a body 18 of the gel chafing fuel 14 is gapped away from the exterior shell 12 by distance 20 (e.g., ⅞"). By doing so, even if the gel chafing fuel 14 reaches a temperature that can melt or deform he exterior shell 12 the exterior shell 12 does not melt or deform and is sufficiently cool so that a user can grasp or touch the exterior shell 12 without burning his or her fingers.

Referring now to FIGS. 1 and 2, the portable stove 10 may be formed from the exterior shell 12, the holder 16, an optional wireframe cover 22 and an optional retainer 44. The exterior shell 12 may be fabricated from a material that may melt or deform when exposed to excessive heat or a temperature above 105° F. The exterior shell 12 may be fabricated from a material that is an insulator so that the exterior shell 12 can be handled by the user. By way of example and not limitation, the exterior shell 12 may be fabricated from plastic, PVC, etc.

In the portable stove 10, the gel chafing fuel 14 may be a heat source and may generate flames that exceed 105° F. and may reach up to 500° F. Additionally, the heat generated by the gel chafing fuel 14 may be conducted to the body 18 of the gel chafing fuel 14. As such, the body 18 may be too hot for a person to touch and hold the body 18 of gel chafing fuel 14. By placing the exterior shell 12 around the gel chafing fuel 14 and forming the gap 20 so that the gel chafing fuel 14 does not directly contact the exterior shell 12, the portable stove 10 permits the person to touch the exterior shell 12 and manipulate the position of the portable stove 10 and gel chafing fuel 14 even when the gel chafing fuel 14 is burning. The exterior shell 12 is protected from the heat generated from the gel chafing fuel 14 by the space 20 between the gel chafing fuel 14 and the exterior shell 12. Moreover, an upper edge 26 of the body 18 of the gel chafing fuel 14 may be vertically higher than an upper peripheral edge 28 of the exterior shell 12. The flames of the gel chafing fuel 14 which rise up above the upper edge 26 will not directly contact the exterior shell 12 even when windy and will not overheat the exterior shell 12 so as to cause deformation or melting thereof or cause the exterior shell 12 to be excessively hot which would prohibit the user from grasping the exterior shell 12 with his or her fingers.

Figure 3:
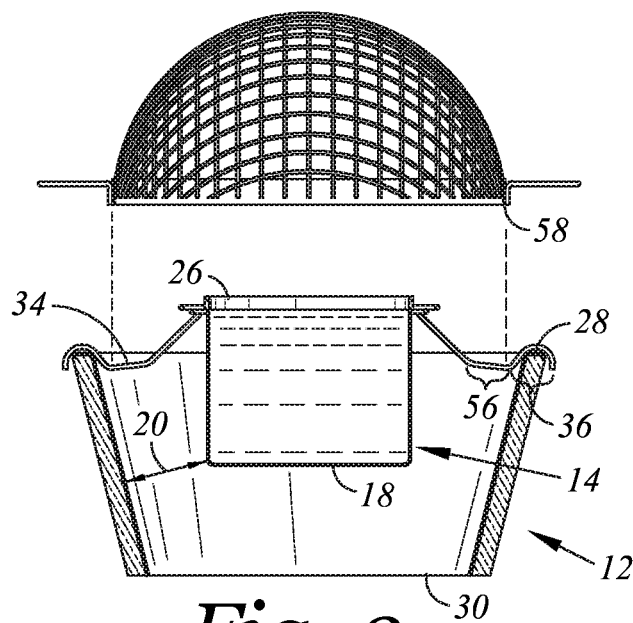
FIG. 3 is a cross-sectional view of the portable stove shown in FIG. 1.
Figure 10:
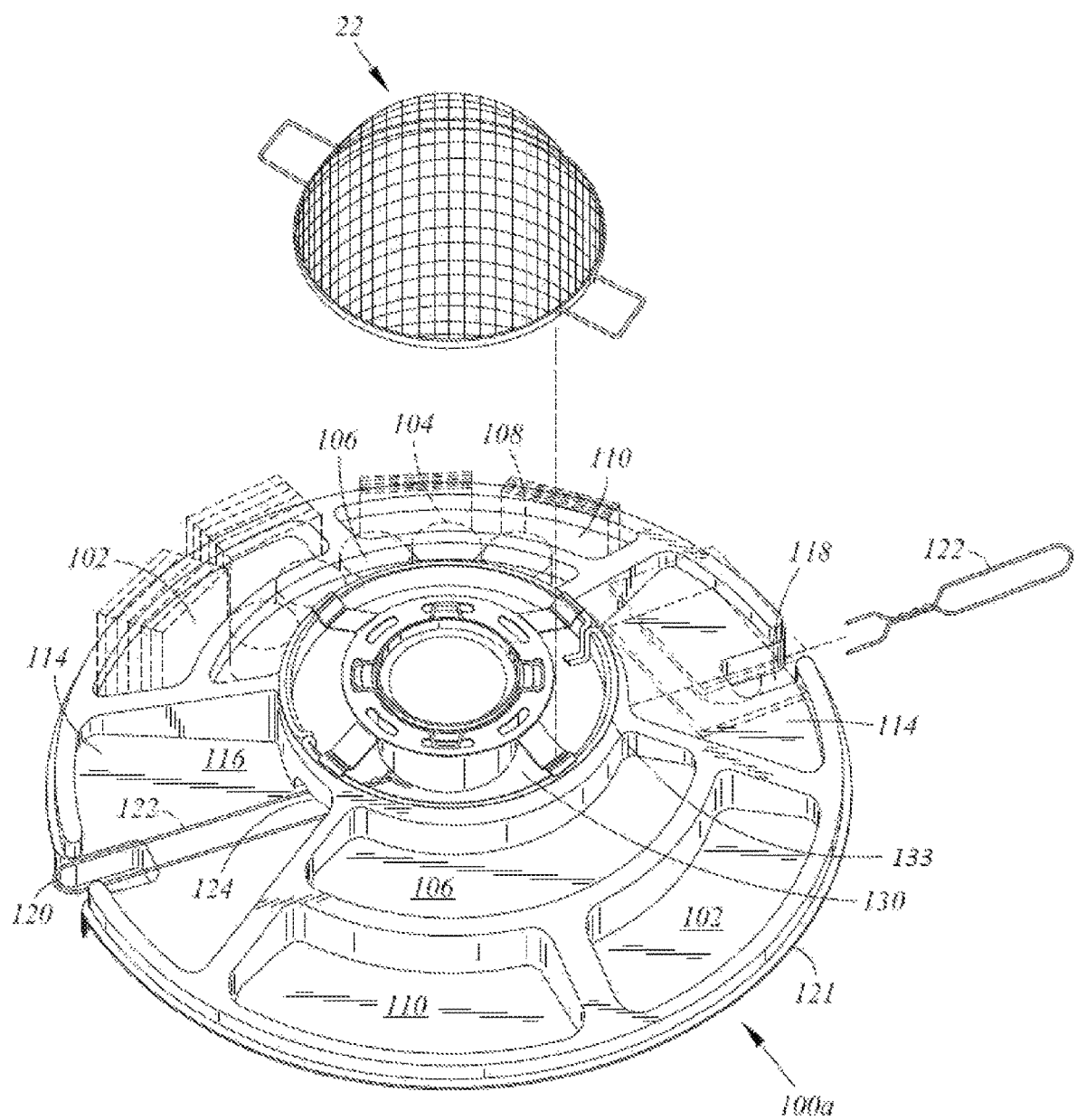
FIG. 10 is a perspective view of a first embodiment of a tray for cooking s'mores.

The exterior shell 12 may have an inverted frusto conical configuration, as shown in FIG. 3. However, other configurations are also contemplated including but not limited to cylindrical, box, polygonal, and other unique shapes. The exterior shell may also be configured as a tray as shown in FIGS. 10 and 11. The exterior shell 12 may have an open bottom 30 to facilitate air flow, as shown in FIG. 3 or may be closed so as to capture any debris that falls from the gel chafing fuel 14 or items being cooked above the portable stove 10.

The gel chafing fuel holder 16 may be fabricated from a material that is heat resistant and that even though the material is subjected to temperatures above 105° F. or higher (e.g., 500° F.), the material does not deform or melt. By way of example and not limitation, the chafing fuel holder 16 may be fabricated from aluminum, aluminum alloys, steel, steel alloys and the like.

The gel chafing fuel holder 16 shown in FIGS. 1-3 is shown as being fabricated from a 1/32" inch diameter metallic wire rod. The holder 16 may have a ring 32 and at least three legs 34. Preferably, the holder 16 has between three and five legs 34. The holder 16 shown in FIGS. 1-3 has four legs 34 evenly spread apart on the ring 32. The legs 34 may each have an inverted concave section 36. The inverted concave section 36 may have an inverted curved U-shape or an inverted V-shape. In the drawings, the inverted concave section 36 is shown as having the inverted curved U-shape. The inverted concave section 36 of the legs 34 receives the upper peripheral edge 28 of the exterior shell 12. When the holder 16 is stacked on top of the exterior shell 12, the legs 34 are distributed about the ring 32 so that the ring 32 is stably positioned, preferably at the center of the exterior shell 12. The legs 34 are bent so that the ring 32 is vertically disposed at a higher elevation compared to the upper peripheral edge 28 of the exterior shell 12. In this way, the upper edge 26 of the body 18 of the gel chafing fuel 14 and the flames of the gel chafing fuel 14 rise vertically up and do not come in contact with the exterior shell 12 even during windy conditions. The legs 34 are preferably positioned about the ring 32 at equal angular spacings between the legs 34. In FIG. 2, four legs 34 are shown. In this regard, each of the legs 34 are angularly spread about the ring 32 at about 90° from each other. If there were only three legs 34, then each of the legs 34 would be spaced apart about 120° from each other.

By forming the holder 16 from a small diameter aluminum wire rod, any heat that is conducted from the gel chafing fuel 14 to the holder 16 is sufficiently dissipated to prevent the distal end portions of the legs 34 from becoming hot to the touch. As shown in FIG. 3, the distal end portions of the legs 34 could be touched by the user. As such, it is important that the distal end portions of the legs 34b be sufficiently cool by dissipating any heat that is transferred to the legs 34 from the heat source before the heat excessively heats up the distal end portion.

The ring 32 may have a circular shape. However, other shapes are also contemplated including but not limited to rectangular, polygonal, etc. The circular shaped ring 32 may define an inner diameter 38 which may be sized so that the gel chafing fuel 14 slips right through the ring 32. In particular, the inner diameter 38 of the ring 32 may be greater than an outer diameter 40 of the body 18 of the gel chafing fuel 14. Typically, the body 18 of the gel chafing fuel 14 is fabricated from a closed bottom cylindrical body 18 with an upper lid 43 that is crimped onto the upper edge of the body 18. The crimping extends beyond the outer diameter 40 of the body 18. In this regard, it is preferable but not necessary that the outer diameter 42 or the greatest width of the body 18 which would be at the crimp be smaller than the inner diameter 38 of the ring 32 of the holder 16.

Even if the outer diameter 42 of the gel chafing fuel 14 is smaller than the inner diameter 38 of the ring 32 of the holder 16 so that the gel chafing fuel 14 falls out of the holder 16, the retainer 44 may be used in conjunction with the gel chafing fuel 14 to support the gel chafing fuel 14 in the holder 60. The retainer 44 may have two or more tabs 46 and base portions 48 that are disposed between adjacent tabs 46.

The base portions 48 may be sized so as to have a snug friction fit about the body 18 of the gel chafing fuel 14. The retainer 44 may also be fabricated from a metallic (preferably—9-aluminum) small diameter wire rod as the holder 16. In this regard, the retainer 44 is flexible and can be resiliently deflected so as to press against the exterior surface of the body 18 of the gel chafing fuel 14 in order that the retainer 44 does not slip off of the body 18 when it 44 is mounted to the gel chafing fuel 14. Moreover, since the crimped portion 50 has a larger outer diameter 42 than the outer diameter 40 of the body 18, the retainer 44 does not allow the gel chafing fuel 14 to slip through the retainer 44. Rather, the retainer 44, and more particularly the base portions 48 are caught under the crimped portion 50 of the gel chafing fuel 14. The tabs 46 may have the distal ends 52 which collectively define a circle having a diameter 54. The diameter 54 defined by the distal ends 52 of the retainer 44 may be greater than the inner diameter of the ring 32 of the holder 16. When the retainer 44 is mounted to the gel chafing fuel 14, the tabs 46 of the retainer 24 reside on top of the ring 32 and prevent the gel chafing fuel 14 from slipping through the ring 32. The retainer 44 may be fabricated from a small diameter wire rod so that heat transferred to the retainer 44 is sufficiently dissipated and does not heat the legs 34 of the holder 16.

The tabs 46 may extend beyond the ring 32 so that the gel chafing fuel 14 does not fall through the ring 32. Moreover, the user can grip one or more of the tabs 46 in order to lift the gel chafing fuel 14 out of the ring 32 and the exterior shell 12 and to replace the gel chafing fuel 14. To further facilitate lifting the gel chafing fuel 14 out of the ring 32, one or more of the tabs 46 may be extended further in order to make it easier for the user to grip the tab 46. Additionally, one or more of the tabs 46 may be bent upright to make the tab 46 more accessible and further facilitate gripping of the tab 46 by the user.

The holder 16 may also have an upright concave section 56 that receives the lower peripheral edge 58 of the wireframe cover 22 as shown in FIG. 3.

The wireframe cover 22 may be formed from a mesh wire rod having a dome configuration. The wire frame cover 22 may have about 1/16" to 1/4" mesh and is preferably between about 1/16" to 1/8" mesh. The mesh should be small enough to heat and glow. The wireframe cover 22 may be coated with a thermochromic ink so that the wireframe cover 22 changes color to indicate to others that the wireframe cover 22 is hot and should not be handled with bare hands. By way of example, the thermochromic ink can change into a red color when the temperature of the wireframe cover 22 exceeds a predetermined temperature (e.g., 100 degrees Fahrenheit). The thermochromic ink may also be coated on the wireframe cover 22 so that it spells DO NOT TOUCH WHEN RED or some other terms of similar meaning. The wireframe cover 22 may be placed over the gel chafing fuel 14 and defines a minimum distance that the s'more can be held to the gel chafing fuel 14. The mesh of the wireframe cover 22 allows the flames to extend through and heat the s'more. The wireframe cover 22 may have one or more handles 60 so that the user can manipulate the cover 22 during the cooking process.

Figure 4:
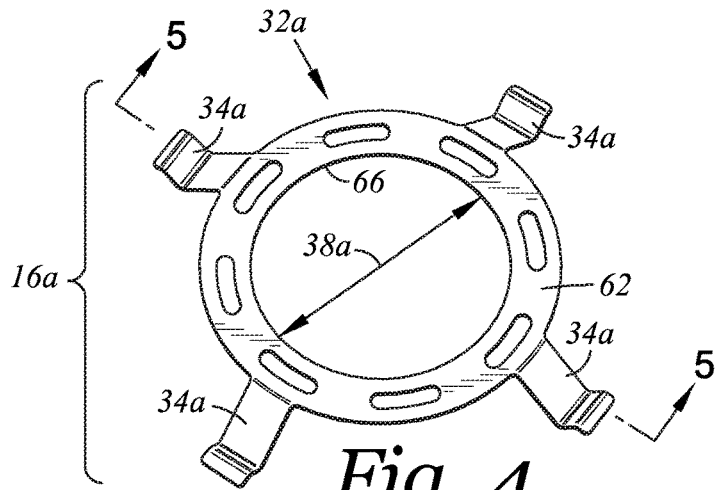
FIG. 4 is a perspective view of a second embodiment of a holder for the portable stove shown in FIG. 1.
Figure 5:
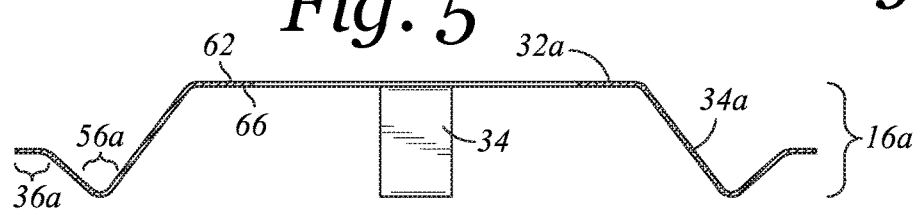
FIG. 5 is a cross-sectional view of the holder shown in FIG. 4.

Referring now to FIGS. 4 and 5, a second embodiment of the holder 16a is shown. The holder 16a may have three or more legs 34a. In FIG. 5, the holder 16a is shown as having four legs 34a spread apart angularly in equal spaces. The holder 16a may also have a ring 32a with an inner diameter 38a. The holder 16a operates in the same manner as that of the holder 16. The difference between the holder 16a and that of 16 is that the holder 16a is fabricated from a unitary sheet material whereas the holder 16 is fabricated from a small diameter wire rod. Referring now to FIG. 5, the legs may also have an inverted U-section 36a that receives the upper peripheral edge 28 of the exterior shell 12. The inverted U-section 36a shown in FIG. 5 does not show the distal ends curving downward. Nonetheless, the inverted U-section 36a of the legs 34a shown in FIG. 5 support the holder 16a on top of the upper edge 28 of the exterior shell 12. The legs 34a may also have upright concave sections 56a that receive the lower peripheral edge 58 of the wireframe cover 22. The top surface 62 of the ring 32 may be vertically higher than the inverted U-section 36 so that the upper edge 26 (see FIG. 3) of the body 18 of the gel chafing fuel 14 may be positioned vertically higher than the exterior shell 12 so that the flames and the heat from the gel chafing fuel 14 do not melt or deform or expose the exterior shell to excessive temperatures.

Figure 6:
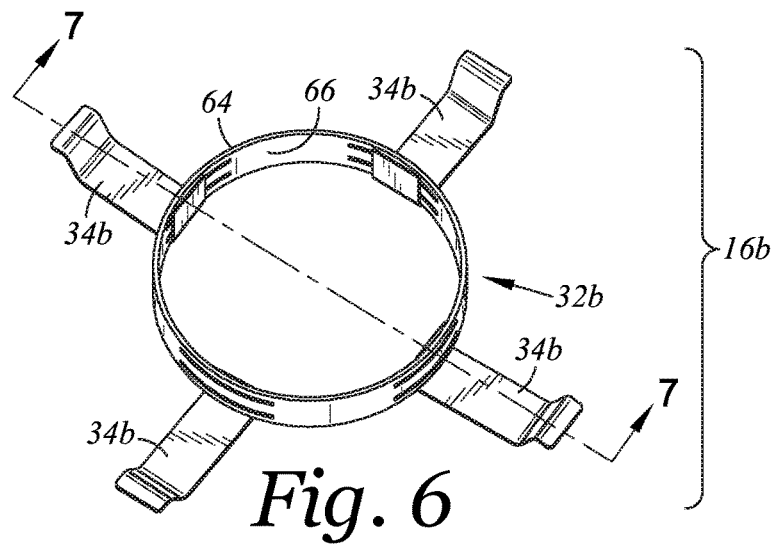
FIG. 6 is a perspective view of a third embodiment of the holder for the portable stove shown in FIG. 1.
Figure 7:
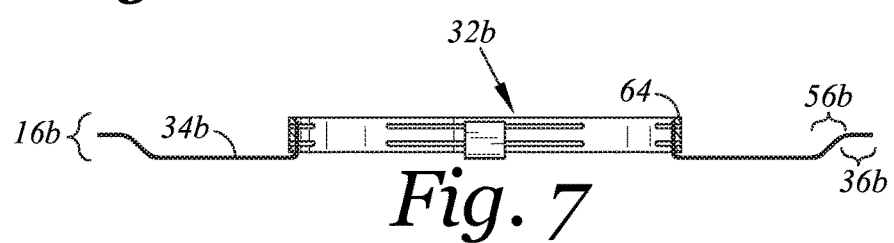
FIG. 7 is a cross-sectional view of the holder shown in FIG. 6.

Referring now to FIGS. 6 and 7, a third embodiment of the holder 16b is shown. In this embodiment, the legs 34b are fabricated from a sheet material that is subsequently welded onto the ring 32b which is also fabricated from a sheet material. The ring 32b instead of having a large area top surface 32a as that shown in FIG. 4, the ring 32b shown in FIGS. 6 and 7 is formed into a band so that only the upper edge 64 of the ring 32b contacts the tabs 46 of the retainer 44. In this regard, less heat is transferred to the holder 16 through the retainer 44 and its contact with the upper edge 64 of the ring 32b. However, the body 18 of the gel chafing fuel 14 may contact more of the inner surface 66 of the ring 32c compared to the inner edge 66 of the ring 32a.

Figure 8:
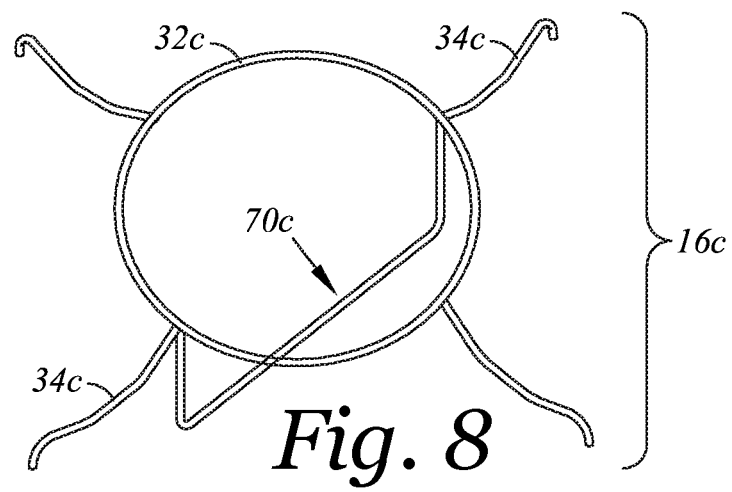
FIG. 8 is a perspective view of a first variant of a fourth embodiment of the holder for the portable stove shown in FIG. 1.
Figure 9:
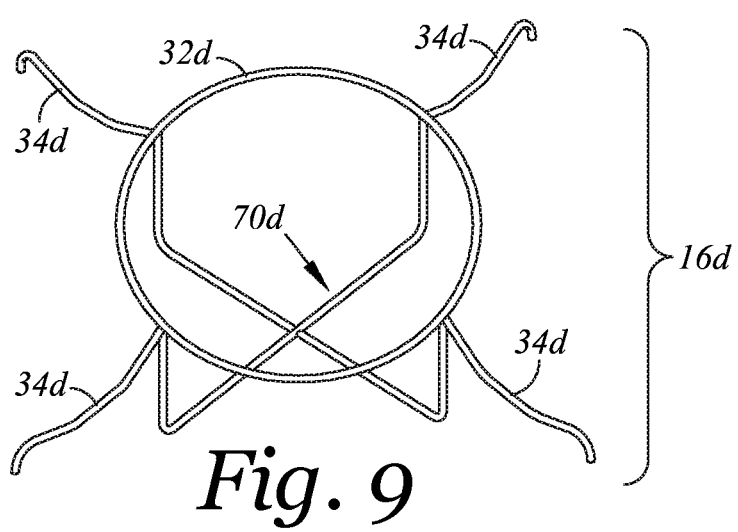
FIG. 9 is a perspective view of a second variant of the fourth embodiment of the holder for the portable stove shown in FIG. 1.

Referring now FIGS. 8 and 9, two variants of a fourth embodiment of the holder 16 is shown. When the holder 16c, d is utilized in the portable stove 10, the retainer 44 is not needed. The reason is that the holders 16c, d has a basket 70c, d formed under the ring 32c, d. The holders 16c, d are fabricated in the same manner as that described in relation to the holder 16 in reference to FIGS. 1-3. The basket 70 may be fabricated from one or two U-shaped pieces. In FIG. 8, a single U-shaped piece is attached to the ring 32c. The body 18 of the gel chafing fuel 14 rests on top of the bottom portion of the piece and the ring 32c holds the body 18 of the gel chafing fuel 14 in its upright position. The piece may be fabricated as a unitary piece with the legs 34c that extend in line with the piece of the basket 70c shown in FIG. 8. Similarly the basket 70d shown in FIG. 9 has two U-shaped pieces that support the body 18 of the gel chafing fuel 14. The two U-shaped pieces may be fabricated as a unitary piece with the legs 34d that extend in line with the two pieces of the basket 70d.

Referring now the FIGS. 10 and 11, two different embodiments of tray 100a, b for holding various components of a s'more is shown. In the tray 100a shown in FIG. 10, the tray 100a may have graham cracker holding compartments 102 for holding graham crackers 104, a marshmallow compartment 106 for holding marshmallows 108 and a chocolate bar holding compartment 110 for holding chocolate bars 112. The various compartments 102, 106, 110 are disposed preferably about the central hole 130 in which the gel chafing fuel 14 is disposed as discussed below. The compartments 102, 106, 110 may be disposed on opposite sides of the central hole 130 so that two or more people may sit around the tray 100a and have access to all of the graham crackers 104, marshmallows 108 and chocolate bars 112 without having to reach over the heat source. The tray 100a may also have two staging compartments 114 having a flat surface 116 on opposite sides of the central hole 130.

In the tray 100b shown in FIG. 11, the tray 100b may have graham cracker holding compartments 102b for holding graham crackers 104, marshmallow compartments 106b for holding marshmallows 108 and chocolate bar holding compartments 110 for holding chocolate bars 112. The various compartments 102b, 106b, 110b may have a reverse orientation so that the chocolate bars 112, graham crackers 104 and the marshmallows 108 are close to both participants on each side 126a, b of the tray 100b. One person may sit on side 126a and have all of the components of the s'mores immediately adjacent to him or her without having to reach over the heat source 128. Also, one person may sit on side 26b and have all of the components of the s'mores immediately adjacent to him or her without having to reach over the heat source 128. Each person may also have their own dedicated heat source. In the tray 100b shown in FIG. 11, the compartments 102b, 106b, 110b are a flip-flop mirror configuration about central axis 132. However, it is also contemplated that the components 102b, 106b, 110b may have a straight mirror configuration about central axis 132 so that the compartments 110b on the same side 126a, b and the compartments 106b on the same side 126a, b. The compartments 102b are closest to the heat sources 128.

Other configurations of tray 100b are also contemplated such as that shown in FIG. 12 which illustrates a tray 100c having each of the graham cracker holding compartments 102c for holding graham crackers 104, marshmallow compartments 106c for holding marshmallows 108 and chocolate bar holding compartments 110c for holding chocolate bars 112

The trays 100a, b may receive the holder 16, the gel chafing fuel 14 with the retainer 44 disposed thereon and the wireframe cover 22. In particular, the tray 100a is shown as having a central hole 130 in the center of the tray 100a which receives the portable stove 10. In particular, the hole 130 in the tray 100a may have an upper edge 133 which receives the inverted U-section 36, 36a, 36b of the holder 16, 16a, 16b, 16c, 16d. The gel chafing fuel 14 may be centrally disposed within the hole 130 and the wire frame cover 22 may be disposed and held in place by the upright concave sections 56, 56a, 56b of the holder 16, 16a, 16b, 16c, 16d.

The same is true for the tray 100b shown in FIG. 11 except that there are two holes 130 that receive the portable stove 10.

The staging compartments 114 may have a notch 118 so that the user can insert an index finger at a base 120 of the tongs 122 and pull the tongs 122 out of the hole 124 used to store the tongs 122 in the tray 100a. When the tongs 122 are removed, the user can stack the various components of the s'mores on the flat surface 116 of the staging compartment 114. After stacking the various components of the s'mores on the flat surface 116 of the staging, compartment 114, the user can grab the stack of components and grip the same with the tongs 122 to cook the components over the fire or heat at the center of the tray 100a.

Referring now to FIGS. 13-17, a fourth embodiment of the tray 100d is shown. The tray 100d may have a carry tray 140 and a removable washable tray 142. The carry tray 140 may also have grip handles 144 so that the user can carry the tray 102 from place to place to position the tray 100d for cooking s'mores. The tray 140 may also have four generally erect walls that form an inner container and a top surface 148. The top surface 148 may be provided with lock channels 150, as shown in FIG. 16 which are removably engageable with a lock ring 152 that is securable to a bottom end of the gel chafing fuel 14. The lock channels 150 may come as a pair for each gel chafing fuel 14 and be formed in the top surface 148 of the carry tray 140. As shown in FIG. 13, there are two gel chafing fuels 14 that are secured to the carry tray 140. In this regard, there are two sets of lock channels 150 that are formed in the top surface 148 of the carry tray 140, one set for each of the gel chafing fuels 14.

Figure 17:
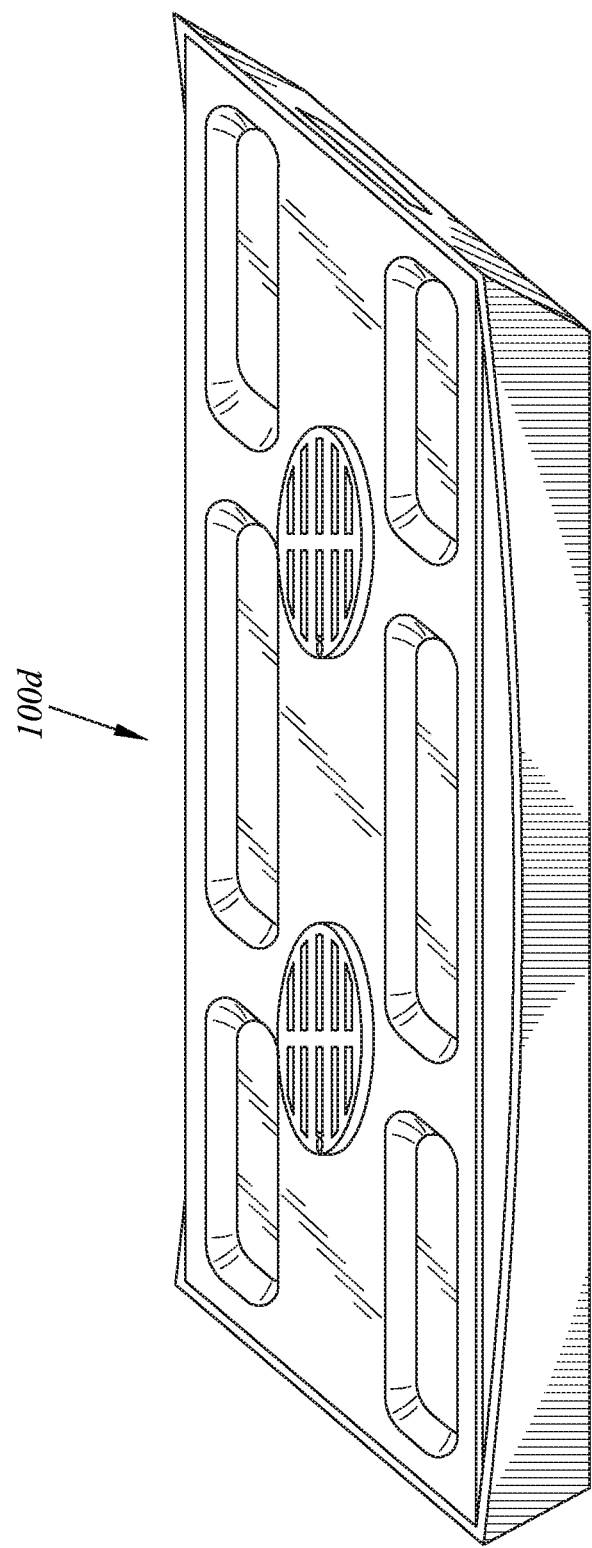
FIG. 17 is an assembled view of the tray shown in FIG. 13.

The top tray 142 may be sized and configured to mate up with the carry tray 140. In particular, an outer perimeter 154 of the top tray 142 may be sized and configured to match with an outer perimeter 156 of the carry tray 140 so that the outer perimeters 154, 156 mate with each other to form a seamless visual look, as shown in FIG. 17. The top tray 142 may have a marshmallow holding compartment 106b, a chocolate bar holding compartment 110d and a graham cracker holding compartment 102d on each side of the gel chafing fuel 14 so that two users can stand or sit on opposed sides of the tray 100d and cook their s'mores without having to reach over the flame to grab a graham cracker 104, marshmallow 108 or chocolate bar 112. Each user may also have their own dedicated gel chafing fuel 14 as well. The top tray 142 additionally may have a flame grill cover 158 that can be pivoted about pivot pin 160 between two positions. In the first position shown in FIG. 13, the flame grill cover 158 is disposed above the gel chafing fuel 14 when the top tray 142 is nested on the carry tray 140. In the second position, the flame grill cover 158 may be pivoted about the pivot pin 160 in the direction of arrow 162 so that the flame grill cover 158 is rotated away from the gel chafing fuel 14 when the user wants to have access to the gel chafing fuel and light the gel chafing fuel 14 and then turn the flame grill cover 158 over the gel chafing fuel 14 when the user is ready to grill the s'mores. The flame grill cover 158 protects s'mores from excessive heat from the flames of the gel chafing fuel 14.

Additionally, as shown in FIGS. 14-16, the lock ring 152 may be attached to the bottom end of the gel chafing fuel 14. In particular, the lock ring 152 may have a circular recess that fits within the bottom end of the body of the gel chafing fuel 14. The body of the gel chafing fuel 14 once inserted into that recess of the lock ring 152 may be adhered to each other by way of an adhesive, hot glue gun or other means of securing the body of the gel chafing fuel 14 to the lock ring 152. The lock ring 152 may have one or more outwardly extending nubs 164 that may be received under the lock channels 150 formed in the top surface 148 of the carry tray 140. In the figures, the lock ring 152 has two nubs on opposite sides. To secure the gel chafing fuel 14 to the carry tray 140, the lock ring 152 may be secured or adhered to the gel chafing fuel 14, as shown in FIG. 14. Once the lock ring 152 is attached or secured to the gel chafing fuel 14, the nubs 164 of the lock ring 152 are aligned to the lock channels formed in the top surface 148 of the carry tray 140. The user twists the can or gel chafing fuel 14 in the clockwise direction so that the nubs 164 of the lock ring 152 are slipped under the lock channels 150. The top surface 148 of the carry tray 140 may have a raised portion that mates with a detent 166 formed in the bottom side of the lock ring 152. In this regard, when the gel chafing fuel 14 is being secured to the carry tray 140, the raised portion is received into the detent 166 first then the gel chafing fuel 14 and the lock ring 152 are rotated in the clockwise direction to secure the nubs 164 under the lock channels 150. To remove the gel chafing fuel 14 from the carry tray 140, the user need only rotate the gel chafing fuel 14 in the counterclockwise direction to release the knobs 164 out from under the lock channels 150.

The tray 100d may also have one or more tongs 122. Preferably, there are four tongs 122 that can be stored between the top tray 142 and the carry trade 140.

The above description is given by way of example, and not limitation. Given the above disclosure, one skilled in the art could devise variations that are within the scope and spirit of the invention, including various ways of configuring the shell 12 or trays 100. Further, the various features of this invention can be used alone, or in varying combinations with each other and are not intended to be limited to the specific combination described herein. Thus, the invention is not to be limited by the illustrated embodiments.

What is claimed is:

1. A combination heater for making s'mores and for use with a gel chafing fuel disposable within a cylindrical body disposed within the combination heater, the cylindrical body having a fuel upper edge and an opposing fuel closed bottom, the combination heater comprising:

a lower exterior shell for holding the gel chafing fuel which burns when ignited, the lower exterior shell having an upper peripheral edge;

a wire frame cover disposed above the lower exterior shell to define a minimum distance between the gel chafing fuel and the wire frame cover, the wire frame cover having a lower peripheral edge;

a gel chafing fuel holder attached to the lower exterior shell so that the lower exterior shell does not burn a person's finger touching the lower exterior shell when the gel chafing fuel is burning, the gel chafing fuel holder having a ring and at least three legs, the ring having a hole that defines an inner diameter, the inner diameter of the hole of the ring being greater than an outer diameter of the gel chafing fuel, the at least three legs each extending from the ring to the upper peripheral edge of the lower exterior shell, distal portions of the at least three legs adapted to have first seats on bottom sides of the at least three legs for receiving the upper peripheral edge to center the ring within the lower exterior shell and a second seat on top sides of the at least three legs for receiving the lower peripheral edge of the wire frame cover to center the wire frame cover on top of the lower exterior shell; and a retainer having three or more tabs extending outward so that a circle defined by distal points of the three or more tabs has a diameter greater than an inner diameter of the hole of the ring of the gel chafing fuel holder, the cylindrical body being positionable in the ring of the gel chafing fuel holder and supportable by the three or more tabs in contact with the ring of the gel chafing fuel holder adjacent the fuel upper edge without the cylindrical body making any direct contact with the gel chafing fuel holder or the lower exterior shell.

2. The combination heater of claim 1 wherein the lower exterior shell is fabricated from a non heat resistant material.

3. The combination heater of claim 1 wherein the first seats of the at least three legs define a circle having a diameter equal to or about equal to a diameter of the upper peripheral edge of the lower exterior shell so that the first seats physically contact the upper peripheral edge.

4. The combination heater of claim 3 wherein the second seats of the at least three legs define a circle having a diameter equal to or about equal to a diameter of the lower peripheral edge of the wire frame cover so that the second seats physically contacts the lower peripheral edge.

5. The combination heater of claim 1 wherein the first seats has an inverted concave configuration.

6. The combination heater of claim 1 wherein the gel chafing fuel holder is fabricated from 1/32 inch thick sheet metal or a 1/16 inch diameter metallic wire rod.

7. The combination heater of claim 1 wherein the gel chafing fuel holder is fabricated from a material that does not melt if raised to a maximum temperature of the gel chafing fuel and the lower exterior shell is fabricated from a material that does melt if raised to a maximum temperature of the gel chafing fuel.

8. The combination heater of claim 7 wherein the gel chafing fuel holder is fabricated from a metallic material and the lower exterior shell is fabricated from a plastic material.

9. The combination heater of claim 1 wherein the three or more tabs is unitary with the body.

10. The combination heater of claim 1 wherein the three or more tabs is fabricated from a 1/16 inch diameter wire rod that circumscribes the body and has an inner diameter smaller than an outer diameter of an upper crimped edge of the body.

11. The combination heater of claim 1 wherein the lower exterior shell is a s'more tray having:
    at least one graham cracker holding compartment sized for holding a plurality of graham crackers;
    at least one marshmallow holding compartment sized and configured for holding a plurality of marshmallows;
    at least one chocolate bar holding compartment sized for holding portions of flat chocolate bars;
    at least one staging area for stacking the graham cracker, marshmallow and chocolate bar; and
    a central hole into which the gel chafing fuel holder and gel chafing fuel may be placed to provide a heat source to make s'mores.

12. The combination heater of claim 11 wherein the s'more tray has:
    two graham cracker holding compartments for holding graham crackers;
    at least two marshmallow holding compartment for holding marshmallows;
    at least two chocolate bar holding compartment for holding chocolate bars; and
    at least two staging areas for stacking the graham crackers, marshmallows and chocolate bars;
    wherein the graham cracker holding compartments are disposed on opposite sides of the single hole, the chocolate bar holding compartments are disposed on opposite sides of the single hole so that two people can have access to all components of the s'more during use.

13. A heater for making s'mores for use with a gel chafing fuel disposable within a cylindrical body having a fuel upper edge and an opposing fuel closed bottom, the heater comprising:
    an exterior shell for holding the gel chafing fuel which burns when ignited, the exterior shell having an upper peripheral edge;
    a gel chafing fuel holder attached to the exterior shell so that the exterior shell is touchable by a person when the gel chafing fuel is burning without burning the person, the gel chafing fuel holder having a ring and legs, the ring has a hole that supports the cylindrical body at the fuel upper edge without the fuel closed bottom making direct contact with the exterior shell or the gel chafing fuel holder, the legs each extending from the ring to the upper peripheral edge of the exterior shell to center the gel chafing fuel in the exterior shell when the cylindrical body is received in the hole of the ring of the gel chafing fuel holder, distal portions of the legs being supportable by the upper peripheral edge; and
    a retainer having tabs extending outward so that a circle defined by distal points of the tabs has a diameter greater than an inner diameter of the hole of the ring of the gel chafing fuel holder, the cylindrical body being positionable in the ring of the gel chafing fuel holder and supportable by the tabs in contact with the ring of the gel chafing fuel holder adjacent the fuel upper edge without the cylindrical body making any direct contact with the gel chafing fuel holder or the exterior shell.

14. The heater of claim 13 further comprising a wire frame cover disposed above the exterior shell to define a minimum distance between the gel chafing fuel and the wire frame cover, the wire frame cover having a lower peripheral edge supportable on the legs of the gel chafing fuel holder.

15. The heater of claim 14 wherein the legs are at least three legs that define second seats that receive the lower peripheral edge of the wire frame cover.

16. The heater of claim 13 wherein an inner diameter of the hole of the ring is less than an outer diameter of an upper crimped edge of the body of the gel chafing fuel.

17. The heater of claim 16 wherein the legs are at least three legs.

18. The heater of claim 17 wherein the retainer is fabricated from a wire rod and an inner diameter defined by the base portions are is cooperatively sized with an outer diameter of a body of the gel chafing fuel so that the retainer slides on the body of the gel chafing fuel with a friction fit.

19. The heater of claim 13 wherein the gel chafing fuel holder is fabricated from a material that does not melt if raised to a maximum temperature of the gel chafing fuel and the exterior shell is fabricated from a material that does melt if raised to a maximum temperature of the gel chafing fuel.

20. The heater of claim 19 wherein the gel chafing fuel holder is fabricated from a metallic material and the exterior shell is fabricated from a plastic material.

* * * * *